United States Patent

[11] 3,625,538

[72] Inventor John E. Raidel
Springfield, Mo.
[21] Appl. No. 864,136
[22] Filed Oct. 6, 1969
[45] Patented Dec. 7, 1971
[73] Assignee Ridewell Corporation
Springfield, Mo.

[54] TRIAXLE SUSPENSION ASSEMBLY
10 Claims, 12 Drawing Figs.

[52] U.S. Cl. .................................................. 280/104.5
[51] Int. Cl. .................................................. B60g 19/00
[50] Field of Search .......................................... 280/104.5

[56] References Cited
UNITED STATES PATENTS
2,579,582 12/1951 Jahn ............................ 280/104.5
3,315,977 4/1967 Small ........................... 280/104.5
3,397,896 8/1968 Willetts ....................... 280/104.5

Primary Examiner—Philip Goodman
Attorney—Kingsland, Rogers, Ezell, Eilers & Robbins ABSTRACT: A suspension assembly for triaxle installation having front, central and rear beams connected to the front, central and rear axles. The front and rear beams are oscillating beams pivotally mounted on pedestals depending from the vehicle frame. The central beam is free floating but is pivotally connected to the front beam and bears upwardly against the rear beam for equalization of loads through the beams to the three axles. All beams are rubber-bushing mounted for self-tracking. The front beams serve as radius rods for the central axle, eliminating the need for a separate radius rod to be connected to the central axle.

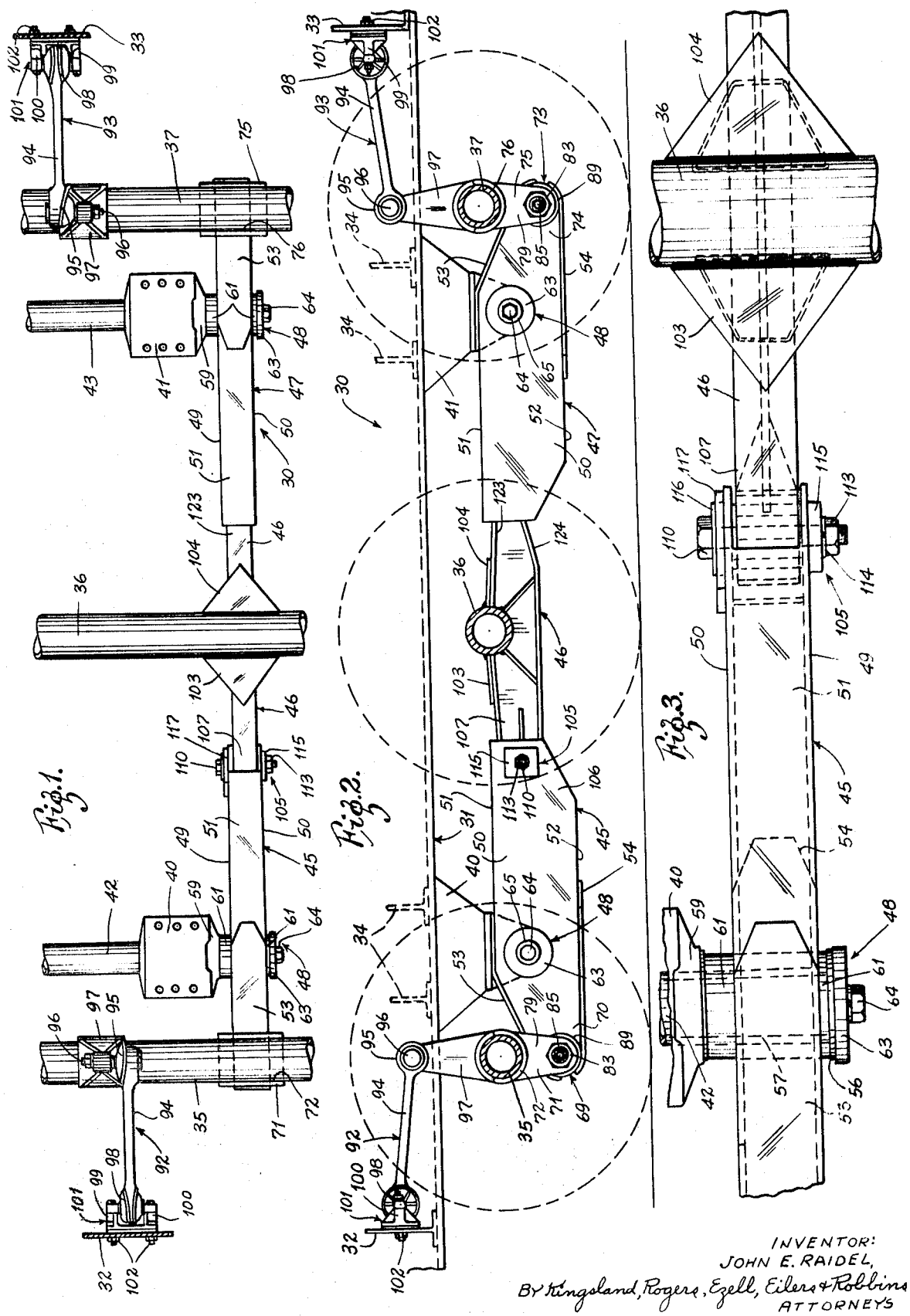

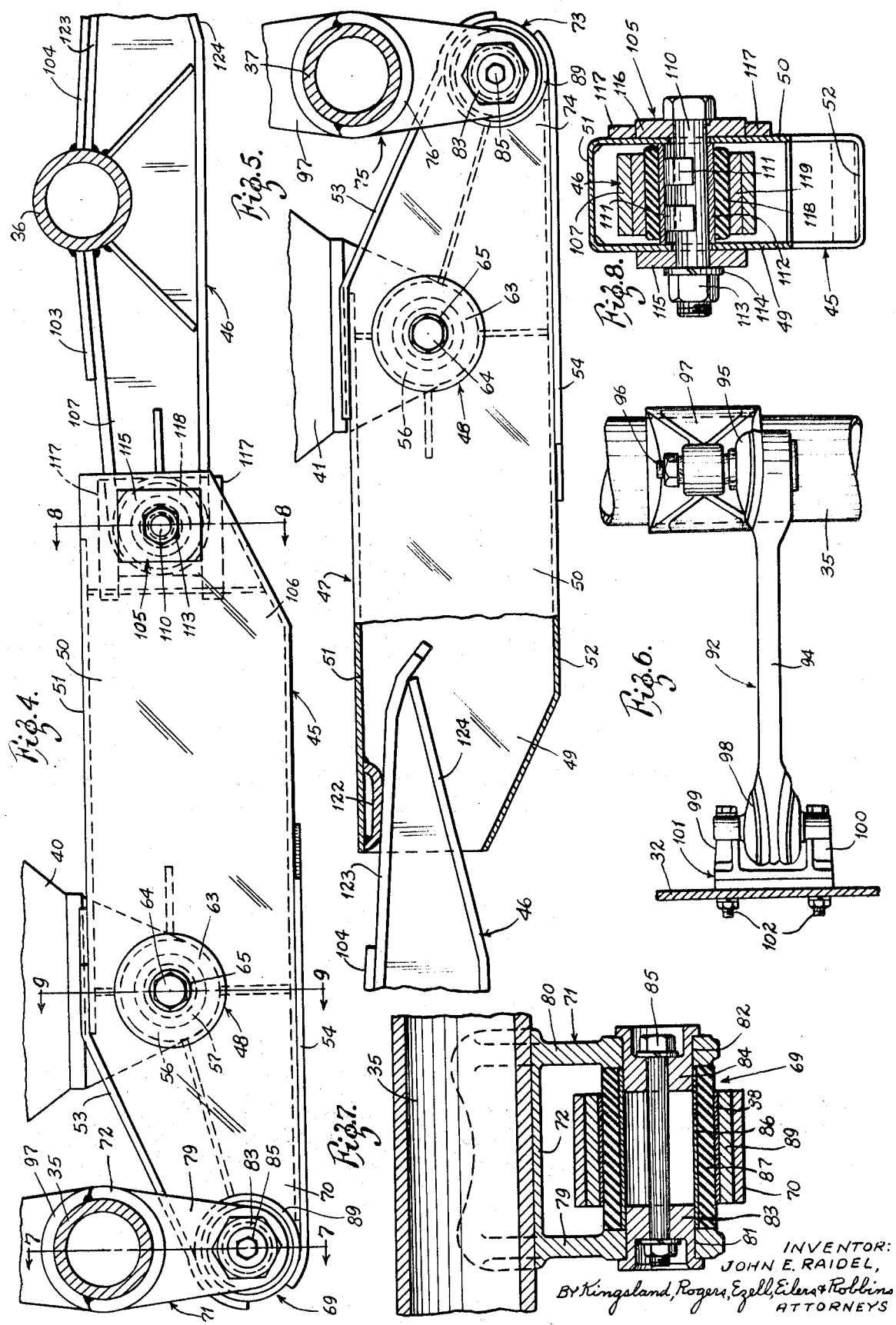

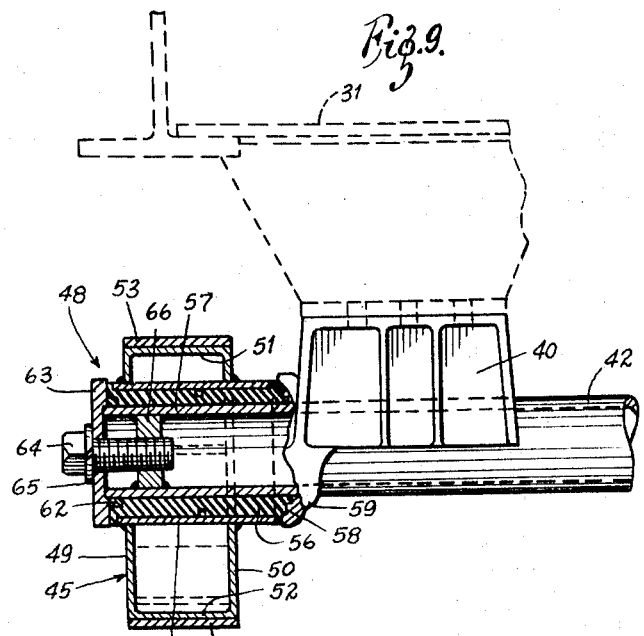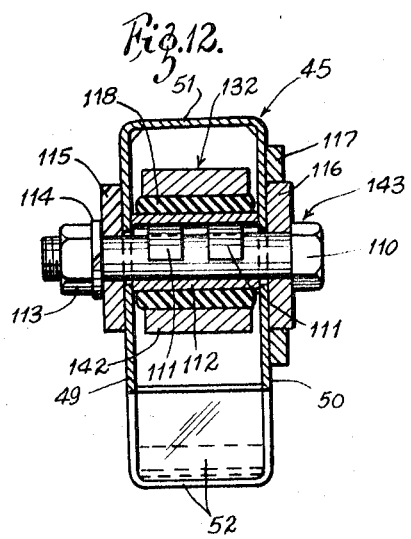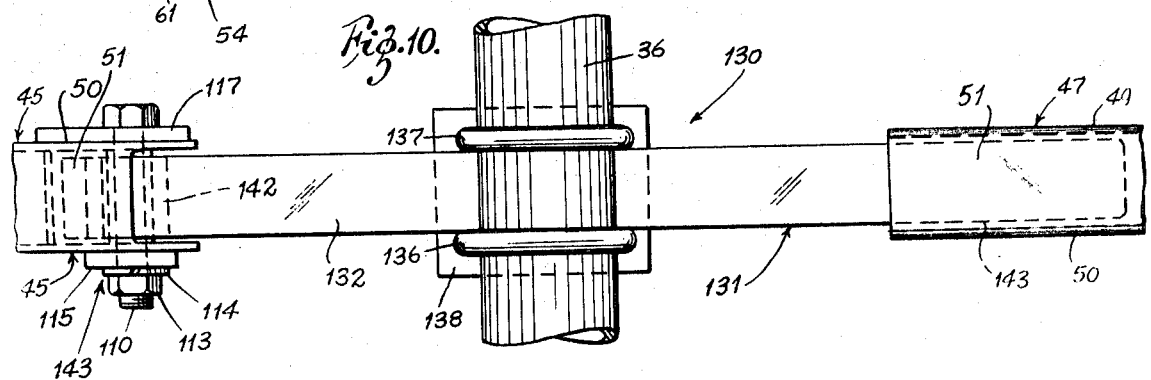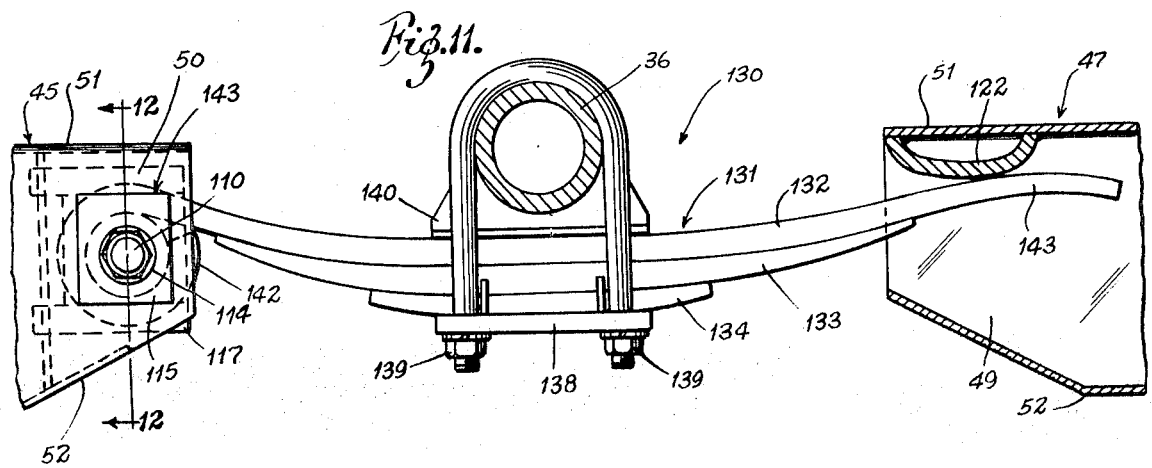

TRIAXLE SUSPENSION ASSEMBLY

BRIEF DESCRIPTION OF THE INVENTION

In this triaxle suspension assembly, one of which is mounted on either side of a vehicle, there is a front oscillating beam assembly, a central beam, and a rear oscillating beam assembly. The front and rear oscillating beam assemblies are pivotally mounted on pedestals depending below the vehicle frame. The central beam is connected to the center axle of the vehicle, but otherwise is free floating relative to the truck frame. The forward end of the central beam is pivotally connected to the rear end of the front oscillating beam assembly. The front end of the front oscillating beam assembly has an articulate connection to the front axle. The rear end of the rear oscillating beam assembly has an articulate connection to the rear axle. The forward end of that rear oscillating beam assembly bears downwardly against the rearward end of the central beam.

The suspension assembly produces equalization of forces on the axles by load transfer through the beams. Also, the suspension assembly produces self-aligning of axles and self-tracking of the wheels.

BRIEF DESCRIPTION OF THE DRAWINGS

FIG. 1 is a top plan view of one side of the triaxle suspension assembly with pedestals removed.

FIG. 2 is a side elevation view of the triaxle suspension assembly.

FIG. 3 is an enlarged fragmentary top plan view of the left portion of the suspension assembly illustrated in FIG. 1.

FIG. 4 is an enlarged elevation view of the left portion of the suspension assembly illustrated in FIG. 2.

FIG. 5 is an enlarged side elevation view partly in section of the right portion of the suspension assembly illustrated in FIG. 2.

FIG. 6 is an enlarged fragmentary top plan view of the forward radius rod as illustrated in FIG. 1.

FIG. 7 is an enlarged view in section taken along the line 7—7 of FIG. 4.

FIG. 8 is an enlarged view in section taken along the line 8—8 of FIG. 4.

FIG. 9 is an enlarged view in section taken along the line 9—9 of FIG. 4.

FIG. 10 is an enlarged top plan view of the central portion of a modification of the triaxle suspension assembly.

FIG. 11 is an enlarged fragmentary side elevation view of the modified triaxle suspension assembly.

FIG. 12 is an enlarged view in section taken along the line 12—12 of FIG. 11.

DETAILED DESCRIPTION OF THE INVENTION

The triaxle suspension assembly 30 is shown mounted to a typical vehicle chassis 31 that has conventional vertical frame elements 32 and 33, with various reinforcing beams 34. The vehicle has three axles including a front axle 35, a center axle 36 and a rear axle 37. As usual, although a suspension assembly 30 is illustrated and described herein for one side of the vehicle, an identical suspension assembly would be mounted on the other side of the vehicle.

To support the suspension assembly 30, a forward pedestal 40 is mounted to and hangs below the chassis 31 rearwardly of the axle 35 and a rearward pedestal 41 is connected to and hangs below the chassis 31 forward of the rear axle 37. A forward trunnion shaft assembly 42 extends between the forward pedestals 40, and a rearward trunnion shaft assembly 43 extends between the rearward pedestals 41.

The suspension assembly 30 includes a forward oscillating beam 45, a central or walking beam 46, and a rearward oscillating beam 47. The forward and rearward oscillating beams 45 and 47 are each rotatably mounted on their respective trunnion shaft assemblies 42 and 43 by identical bushing assemblies 48, as particularly illustrated in FIG. 9. As also shown in FIG. 9, each oscillating beam 45 and 47 is formed with a rectangular frame having sidewalls 49 and 50 and top and bottom walls 51 and 52, with upper and lower reinforcing plates 53 and 54 welded to the top and bottom walls 51 and 52 respectively.

The bushing assembly 48 comprises a rubber bushing 56 that is bonded to the projecting end 57 of the trunnion shaft 42. The bushing 56 is pressed tightly and is distorted against a stepped, converging annular well 58 within an elbow 59 extending from the pedestal 40. A metal sleeve 61 surrounds and is bonded to the rubber bushing 56. The metal sleeve 61 is also welded to the sidewalls 49 and 50 of the oscillating beam 45. A retainer ring 62 is pressed against the outer end of the rubber bushing 56. The retainer ring 62 and the rubber bushing 56 and its surrounding sleeve 61 are held in place by an end cap 63. The end cap 63 is locked in place by a cap screw 64 that is threaded against a lock washer 65 and into a fixed nut 66 that is welded to the inner wall of the trunnion shaft 42.

A bushing assembly 69 pivotally connects the forward oscillating beam assembly 45 adjacent its forward end 70 to a forward beam hanger 71. The forward beam hanger 71 has a cup 72 by which it is mounted against and welded to the forward axle 35. A bushing assembly 73 pivotally connects the rearward oscillating beam assembly 47 adjacent its rearward end 74 to a beam hanger 75 that has a cup 76 bearing against and welded to the rearward axle 37.

As shown in FIG. 7, the bushing assemblies 69 and 73 and the beam hangers 71 and 75 are identical. The beam hanger 71 has opposing arms 79 and 80 with openings 81 and 82 through them for receiving retainer blocks 83 and 84. The retainer blocks 83 and 84 are held in place by a bolt assembly 85. A metal sleeve 86 is mounted around and between the retainer blocks 83 and 84. A rubber bushing 87 is bonded to the metal sleeve 86. Another metal sleeve 88 surrounds and is bonded to the rubber bushing 87. A ring 89 welded in the end 70 of the oscillating beam assembly 45 is rotatably journaled about the outer metal ring 88.

A torque rod assembly 92 is mounted between a member 32 of the vehicle frame 31 and the center of the forward axle 35. An identical torque rod assembly 93 is mounted between a member 33 of the frame 31 and the center of the rear axle 37. As shown in FIG. 6, each torque rod assembly 92 comprises a torque rod 94 having one end 95 pivotally connected by a bolt assembly 96 to an axle bracket 97. The other end 98 of the torque rod 94 is pivotally mounted between the lateral ears 99 and 100 of a frame bracket 101. The frame bracket 101 is fastened by bolt assemblies 102 to the frame member 32.

An eccentric bolt assembly 105 connects the forward oscillating beam 45 adjacent its rearward end 106 to the central beam 46 adjacent its forward end 107. The center axle 36 is welded to the central beam 46. Reinforcing gusset plates 103 and 104 are welded to the axle 36 and the central beam 46. The eccentric bolt assembly 105 includes a bolt 110 having eccentric cams 111 on one of its sides. A metal sleeve 112 is rotatably mounted about the bolt 110 and its eccentric cams 111. The bolt 110 has a nut 113 and lock washer 114 by which it is tightened against side blocks 115 and 116 to a predetermined torque. One of the side blocks 116 is prevented from rotating by suitable plates 117 welded to the side 50 of the forward oscillating beam 45. A rubber bushing 118 is bonded to the metal sleeve 112. A ring 119 that is welded within the center beam 46 is mounted about the rubber bushing 118.

As shown in FIG. 5, a metal-bearing pad 122 is welded to the undersurface of the top wall 51 of the rear oscillating beam 47. The upper side 123 adjacent the rearward end 124 of the central beam 46 bears against the bearing pad 122.

FIGS. 10 through 12 illustrate the modified portions of another triaxle suspension assembly 130 wherein the components not illustrated in FIGS. 10 through 12 are identical to those shown in FIGS. 1 through 9. The difference in the modified suspension assembly 130 is that the central beam 131 comprises a leaf-spring assembly having three leaf springs 132, 133 and 134. The leaf springs 132, 133 and 134 are clamped together by U-bolts 136 and 137 that extend around the center axle 36 and are tightened against a bottom plate 138 by nuts 139. An axle seat 140 that is welded to the central axle 36 bears against the upper side of the leaf spring 132.

The leaf spring 132 has a looped end 142. An eccentric bolt assembly 143 is, as illustrated in FIG. 12, identical to the eccentric bolt assembly 105 illustrated in FIG. 8, with the looped end 142 of the leaf spring 132 surrounding the rubber bushing 118. The other end 143 of the leaf spring 132 is bowed and bears against the metal wear pad 122 that is welded to the rear oscillating beam assembly 47.

OPERATION

With the vehicle travelling to the left as viewed in FIG. 2, the forward axle 35 applies an upward force against the bushing assembly 69 tending to rotate the forward oscillating beam 45 is a clockwise direction. The rearward axle 37 applies an upward force on the bushing assembly 73 tending to rotate the rearward oscillating beam 47 in a counterclockwise direction about its bushing assembly 48. The result is a set of equalizing forces on the central beam 46 with the forward oscillating beam 45 exerting a downward force through the eccentric bolt assembly 105 against the forward end 107 of the central beam 46 and the rear oscillating beam assembly 47 exerting a downward force through the wear pad 122 against the rear end 124 of the central beam 46. These downward forces oppose the upward force that the center tire applies to the center axis 36.

Now, if the vehicle is loaded unequally heavily toward the front axle 35 or if the front tire hits a bump applying an excess upward force against the front axle 35, the forward oscillating beam 45 will tend to rotate with a corresponding excess force or movement in a clockwise direction. This will apply a greater downward force against the front end 107 of the central beam 46. The result is to drive the central axle 36 downwardly so that the center axle and its tire will absorb part of this excess load. At the same time, the resistance of the center tire to this downward force will tend to swing the rear end 124 of the central beam 46 upwardly and to pivot the rear oscillating beam assembly 47 in a clockwise direction, thereby distributing another portion of the excess load to the rear axle 37.

The reverse of these forces takes place if an unequally large load is applied to the rear axle 37. Likewise, if an unequally heavy load is applied to the center axle 36, tending to move the center axle 36 upwardly relative to the vehicle chassis 31, a force tending to rotate the front oscillating beam 45 in a counterclockwise direction and a force tending to rotate the rear oscillating beam 47 in a clockwise direction will result. Consequently, some of this excess load on the center axle 36 will be distributed to both the front and rear axles 35 and 37. The result of these force distributions is high stability and articulation ability of the suspension assemblies 30 and 130.

In addition, because of the rubber bushings in the bushing assemblies 38, 69 and 73 and in the eccentric bolt assembly 105 (and 143) the suspension assemblies 30 and 130 are self-tracking. Thus, as the vehicle tends to turn to the right for a right turn, the resisting force applies to the front tire tends to swing the forward end 70 of the forward oscillating beam 45 outwardly and to swing the rear end 106 inwardly. This tends to swing the central beam 46 so that its forward end 107 swings inwardly and its rear end 124 swings outwardly as permitted by its rubber bushing mounts. The outward force of the rear end 124 of the central beam 46 tends to swing the forward end of the rear oscillating beam 47 outwardly and the rear end 74 inwardly as permitted by its rubber bushing mounts. The result is a tendency of the suspension assemblies 30 and 130 to produce self-tracking of the wheels. Correspondingly, the suspension assembly is self-aligning.

The eccentric bolt assembly 105 (and 143) of which there is one on either side of the vehicle, permits axle alignment. Loosening of the nut 113 permits rotation of the eccentric bolt 110 so that the center axle 36 can be aligned with the front and rear axles 35 and 37.

What is claimed is:

1. A vehicle suspension assembly comprising a forward beam, means to pivotally support the forward beam from the vehicle frame, means pivotally connecting the forward end of the forward beam to the forward vehicle axle, a center beam, means connecting the center beam to the central axle, a rearward beam, means to pivotally support the rearward beam from the vehicle frame, means pivotally connecting the rearward end of the rearward beam to the rearward axle, means pivotally connecting the rearward end of the forward beam to the forward end of the central beam, and bearing means at the forward end of the rearward beam bearing downwardly on the rearward end of the central beam, the center beam being connected to the vehicle frame exclusively through its pivotal connection with the forward beam and through the bearing means.

2. The vehicle suspension assembly of claim 1 wherein all the said pivotal connections include rubber bushings.

3. The vehicle suspension assembly of claim 1 including a radius rod between the forward axle and the vehicle frame, and a radius rod between the rearward axle and the vehicle frame, and wherein the central beam is free of a radius rod.

4. A vehicle suspension assembly for each side of a triaxle vehicle comprising a forward beam, means to pivotally support the forward beam intermediate its ends by the vehicle chassis, a rearward beam, means to pivotally support the rearward beam, intermediate its ends by the vehicle chassis, means pivotally connecting the forward beam to the front vehicle axle forward of the forward beam pivotal support means, means pivotally connecting the rearward beam to the rear vehicle axle rearward of the rearward beam pivotal support means, a central beam, means to connect the central beam intermediate its ends to the center vehicle axle, means between the front and center axles to pivotally connect the forward beam to the central beam, the rearward beam having an area overlying and bearing downwardly against an area of the center beam between the center and rear axles, the central beam being connected to the vehicle frame exclusively through its pivotal connection with the forward beam and through the overlying area engagement with the rearward beam.

5. The vehicle suspension assembly of claim 4 including a radius rod pivotally connected to the vehicle chassis and to the central portion of the front axle, and a radius rod pivotally connected to the vehicle chassis and to the central portion of the rear axle.

6. The vehicle suspension assembly of claim 4 wherein the means pivotally connecting the forward beam to the front axle includes a beam hanger affixed to the front axle and pivotally connected to the forward beam vertically below the front axle, and the means pivotally connecting the rearward beam to the rear axle includes a beam hanger fixed to the rear axle and pivotally connected to the rearward beam vertically below the rear axle.

7. The vehicle suspension assembly of claim 4 wherein the said pivotal supports and pivotal connections comprise resilient bushings.

8. The vehicle suspension assembly of claim 4 wherein the means to pivotally connect the forward beam to the central beam includes a rotatable eccentric to adjust the distance between the front and center axles for axle alignment.

9. A vehicle suspension assembly comprising a forward beam, means to pivotally support the forward beam from the vehicle frame, means pivotally connecting the forward end of the forward beam to the forward vehicle axle, a leaf-spring assembly, means connecting the leaf-spring assembly to the central axle, a rearward beam, means to pivotally support the rearward beam from the vehicle frame, means pivotally connecting the rearward end of the rearward beam to the rearward axle, means pivotally connecting the rearward end of the forward beam to the forward end of the leaf-spring assembly, and bearing means at the forward end of the rearward beam bearing downwardly on the rearward end of the leaf-spring assembly.

10. A vehicle suspension assembly for each side of a triaxle vehicle comprising a forward beam, means to pivotally support the forward beam intermediate its ends by the vehicle chassis, a rearward beam, means to pivotally support the rearward beam intermediate its ends by the vehicle chassis, means pivotally connecting the forward beam to the front vehicle axle forward of the forward beam pivotal support means, means pivotally connecting the rearward beam to the rear vehicle axle rearward of the rearward beam pivotal support means, a leaf-spring assembly, means to connect the leaf-spring assembly intermediate its ends to the center vehicle axle, means between the front and center axles to pivotally connect the forward beam to the leaf-spring assembly, the rearward beam having an area overlying and bearing downwardly against an area of the leaf-spring assembly between the center and rear axles.

* * * * *